(12) United States Patent
Takahashi (10) Patent No.: US 9,317,246 B2
(45) Date of Patent: Apr. 19, 2016

(54) INFORMATION PROCESSING SYSTEM, ELECTRONIC DEVICE, IMAGE FILE PLAYING METHOD, AND GENERATION METHOD

(71) Applicant: Sony Computer Entertainment Inc., Tokyo (JP)

(72) Inventor: Masaki Takahashi, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 14/360,966

(22) PCT Filed: Oct. 23, 2012

(86) PCT No.: PCT/JP2012/006786
§ 371 (c)(1),
(2) Date: May 28, 2014

(87) PCT Pub. No.: WO2013/088628
PCT Pub. Date: Jun. 20, 2013

(65) Prior Publication Data
US 2014/0354663 A1 Dec. 4, 2014

(30) Foreign Application Priority Data
Dec. 13, 2011 (JP) .................................. 2011-272814

(51) Int. Cl.
G06F 3/14 (2006.01)
H04N 21/482 (2011.01)
G06T 1/60 (2006.01)
G06Q 30/06 (2012.01)
G06F 3/0481 (2013.01)
H04N 1/32 (2006.01)

(52) U.S. Cl.
CPC ............ *G06F 3/1454* (2013.01); *G06F 3/0481* (2013.01); *G06Q 30/06* (2013.01); *G06T 1/60* (2013.01); *H04N 21/4828* (2013.01); *G06T 2200/28* (2013.01); *H04N 1/32122* (2013.01); *H04N 2201/3249* (2013.01)

(58) Field of Classification Search
None
See application file for complete search history.

(56) References Cited

U.S. PATENT DOCUMENTS 8,099,455 B2   1/2012   Kristensson
8,700,700 B2   4/2014   Shinomoto
(Continued)

FOREIGN PATENT DOCUMENTS

CN   101779439 A   7/2010
JP   2008271091 A   11/2008
(Continued)

OTHER PUBLICATIONS

International Search Report for corresponding Application PCT/JP2012/006789, dated Jan. 29, 2013.
(Continued)

*Primary Examiner* — Joni Richer
(74) *Attorney, Agent, or Firm* — Matthew B. Dernier, Esq.

(57) ABSTRACT

A reception unit receives an image file from other electronic device. A display processing unit displays an image related to acquisition of content together with a content image if content identification information is included in an acquired image file. The display processing unit displays, as an image relating to acquisition of content, a link button which permits access to a content server.

11 Claims, 8 Drawing Sheets

(56) References Cited

U.S. PATENT DOCUMENTS

| | | | |
|---|---|---|---|
| 2004/0117637 A1* | 6/2004 | Kanno | 713/186 |
| 2004/0155898 A1* | 8/2004 | Taguchi et al. | 345/723 |
| 2008/0259404 A1 | 10/2008 | Yoshizawa | |
| 2009/0049156 A1 | 2/2009 | Kristensson | |
| 2009/0118008 A1 | 5/2009 | Kobayashi | |
| 2009/0325690 A1 | 12/2009 | Zhou | |
| 2010/0274858 A1 | 10/2010 | Lindberg | |
| 2011/0138429 A1* | 6/2011 | Schade et al. | 725/98 |
| 2012/0084354 A1 | 4/2012 | Shinomoto | |

FOREIGN PATENT DOCUMENTS

| | | |
|---|---|---|
| JP | 2009112550 A | 5/2009 |
| JP | 2009187081 A | 8/2009 |
| WO | 2011128957 A1 | 10/2011 |

OTHER PUBLICATIONS

International Preliminary Report on Patentability and Written Opinion for corresponding Application PCT/JP2012/006786, dated Jun. 26, 2014.

European Search Report for corresponding Application 12856604.9-1958, dated May 13, 2015.

Office Action for corresponding CN Application No: 2012800590686, 9 pages, dated Dec. 18, 2015.

* cited by examiner

INFORMATION PROCESSING SYSTEM, ELECTRONIC DEVICE, IMAGE FILE PLAYING METHOD, AND GENERATION METHOD

TECHNICAL FIELD

The present invention relates to a technology for playing an image file.

BACKGROUND ART

A function called screenshot is known which stores image data on a display screen, generated by content during execution of the content, in a memory device in response to a user instruction. This function temporarily stores image data on a display screen in a memory device as the user performs a given operation while watching the screen being displayed. Then, as the user sets a filename and specifies an arbitrary storage location of a hard disk drive, the image file stored in the memory device is stored in the hard disk drive.

PTL 1 proposes a technology relating to screenshot and more specifically discloses a game console. The game console acquires identification information of a game program during execution of the game program, stores a game screen image generated during execution of the game program in association with the identification information, and displays the image associated with the identification information in accordance with user specification.

CITATION LIST

Patent Literature

[PTL 1]
U.S. Patent Publication No. 2009/0118008

SUMMARY

Technical Problem

A screenshot image captured during execution of content represents an execution status of the content by the user. Today's mobile electronic devices commonly have a communication function, allowing screenshot images to be exchanged between these electronic devices. Against the backdrop of such an environment available now, the present inventor proposes a technique for effectively using screenshot image data.

It is an object of the present invention to provide a new technology relating to using screenshot image files.

Solution to Problem

In order to solve the above problem, an information processing system according to a mode of the present invention includes first and second electronic devices. The first electronic device has a retention unit, a first display processing unit, an acceptance unit, an acquisition unit, a file generation unit, and a first transmission unit. The retention unit retains content identification information. The first display processing unit displays a content image. The acceptance unit accepts an instruction to acquire image data. The acquisition unit acquires display image data when the acceptance unit accepts an acquisition instruction. The file generation unit generates an image file that associates the content identification information retained by the retention unit with the acquired image data. The first transmission unit transmits the image file to the second electronic device. The second electronic device has a reception unit and a second display processing unit. The reception unit receives an image file from the first electronic device. The second display processing unit displays a content image using the acquired image file. The second display processing unit displays an image relating to acquisition of content together with a content image.

Another mode of the present invention is an electronic device. This electronic device includes a storage unit and a display processing unit. The storage unit stores a content image file. The display processing unit displays a content image using the stored image file. The display processing unit also displays an image relating to acquisition of content if the content image file has content identification information.

Still another mode of the present invention is an electronic device. This electronic device includes a retention unit, a display processing unit, an acceptance unit, an acquisition unit, and a file generation unit. The retention unit retains content identification information. The display processing unit displays a content image. The acceptance unit accepts an instruction to acquire image data. The acquisition unit acquires display image data when the acceptance unit accepts an acquisition instruction. The file generation unit generates an image file that associates the content identification information retained by the retention unit with the acquired image data.

Still another mode of the present invention is an image file playing method. This method includes the steps of storing a content image file and displaying a content image. The display step displays an image relating to acquisition of content if the content image file has content identification information.

Still another mode of the present invention is an image file generation method. This method includes the steps of retaining content identification information, displaying a content image, and accepting an instruction to acquire image data. This method also includes the steps of acquiring display image data when the acquisition instruction is accepted, and generating an image file that associates the retained content identification information with the acquired image data.

It should be noted that any combinations of the above elements and any conversions of expressions of the present invention between method, device, system, recording media, computer program and so on are also effective as modes of the present invention.

Advantageous Effect of Invention

The present invention provides a new technology relating to using a screenshot image file.

DESCRIPTION OF EMBODIMENTS

Figure 1:
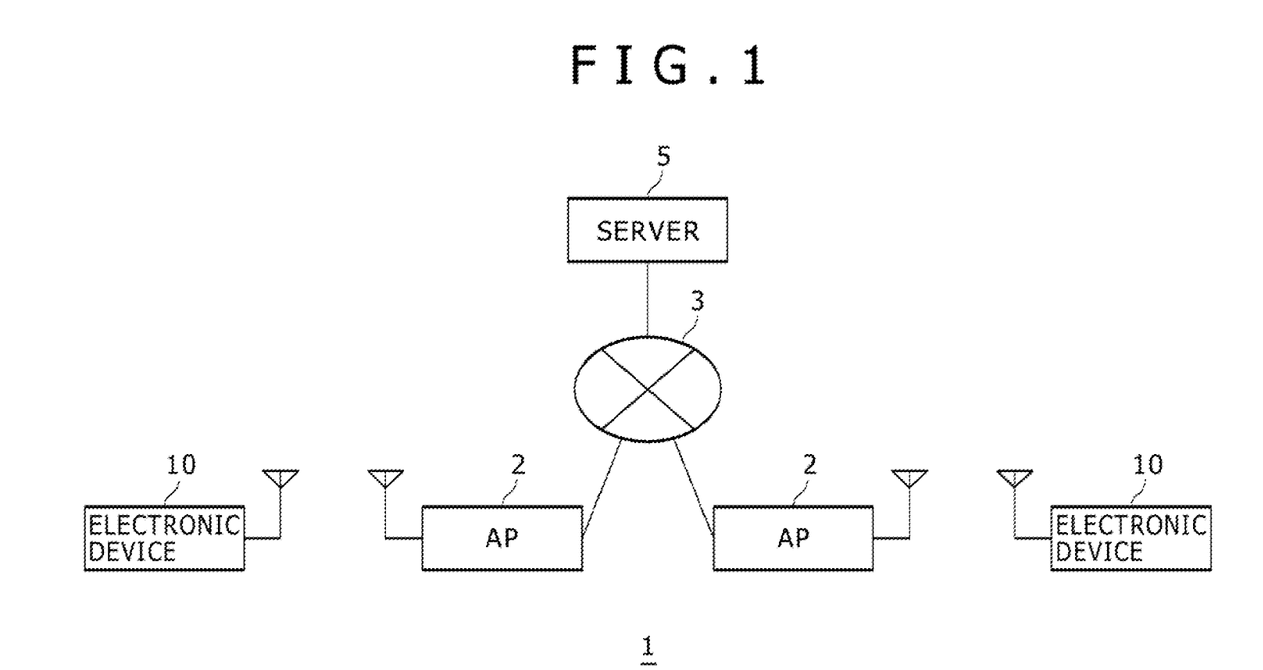
FIG. 1 is a diagram illustrating an example of configuration of an information processing system according to a working example.

FIG. 1 illustrates an example of configuration of an information processing system 1 according to a working example. In the information processing system 1, APs (Access Points) 2 have each functions of a wireless access point and a router. Each of electronic devices 10 connects to a network 3 such as the Internet via the AP 2 and a modem (not shown).

The electronic device 10 has a wireless communication function and connects to a server 5 on the network 3 via one of the APs 2. The server 5 is a content server that retains and manages content such as game programs and movie data. The electronic device 10 has a communication function based on wireless LAN (Local Area Network) system and may communicate with the server 5 in infrastructure mode. Alternatively, the electronic device 10 may communicate with the server 5 by a communication system used for mobile phones such as the third generation mobile communication system. In this case, the electronic device 10 communicates with the server 5 via base stations having a wide communication area, thus allowing the user to use the electronic device 10 outdoors as well. It should be noted that the electronic device 10 may be a portable terminal device or alternatively a stationary terminal device. Further, the electronic device 10 may connect to the network 3 in a wired manner. In the information processing system 1, the user has a user account that identifies himself or herself and signs in to the network services provided by the server 5 using the user account.

The electronic device 10 according to the present working example displays, on a display device, a link button that permits access to the server 5. In the electronic device 10, the link button is associated with content and used to acquire content retained by the server 5. The electronic device 10 retains address information of the server 5 on the network 3. When the link button is manipulated, the electronic device 10 can access the server 5. When accessing the server 5, the electronic device 10 transmits content identification information (hereinafter referred to as a "content ID") to the server 5. Upon receipt of the content ID, the server 5 transmits, to the electronic device 10, data for generating a page (acquisition page) that is used to acquire content. The electronic device 10 displays the acquisition page on the display device using this data. The user can download the content to the electronic device 10, for example, by pressing a purchase button.

A description will be given below of appearance and circuit configurations of the electronic device according to the present working example. The electronic device described below is a portable game console. However, the electronic device may be other type of portable terminal device. It should be noted that the electronic device 10 may be not only a portable terminal device but also a stationary terminal device in the information processing system 1.

[Configuration of the Front Face]

Figure 2:
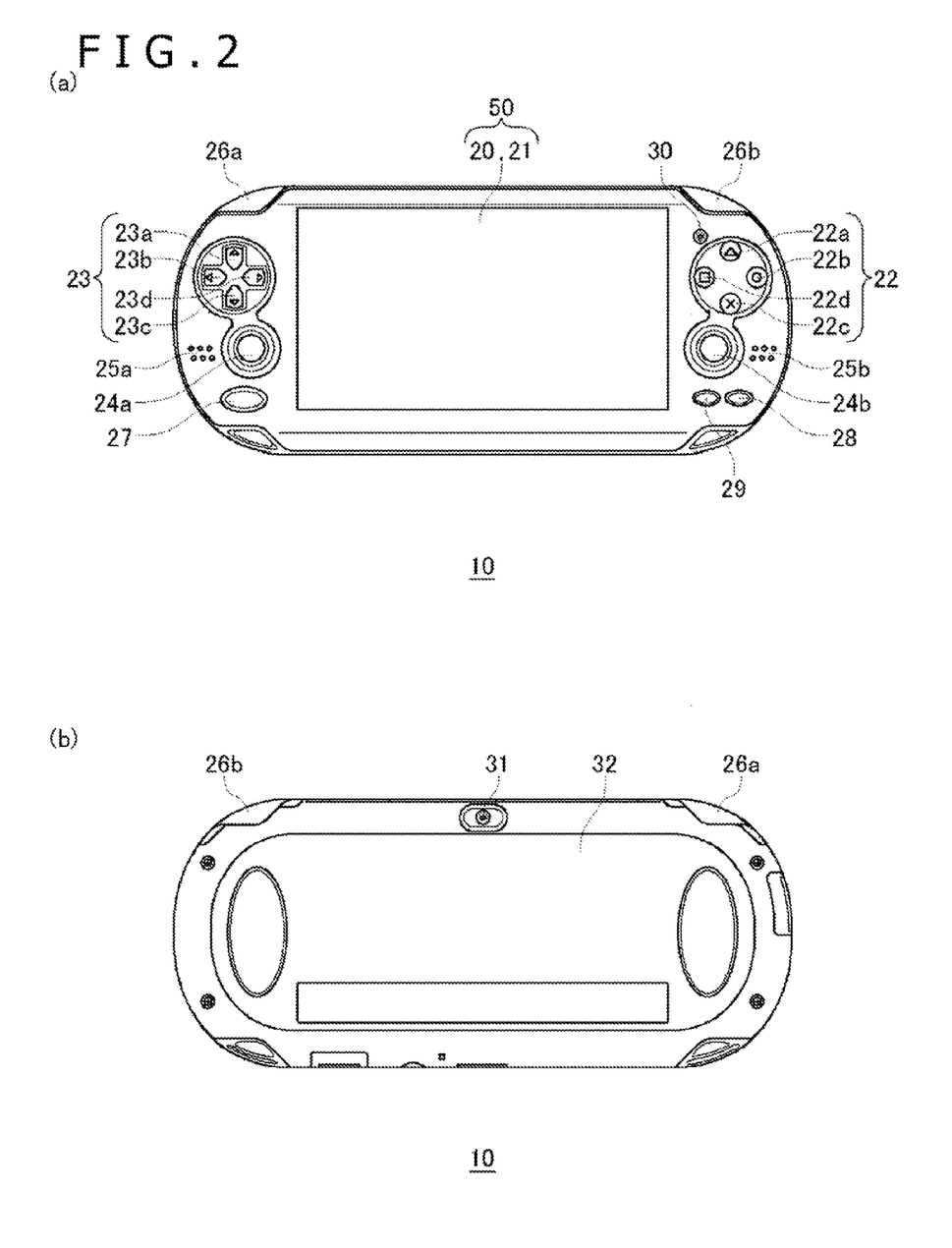
FIG. 2(a) is a diagram illustrating a front face of an electronic device.
FIG. 2(b) is a diagram illustrating a rear face of the electronic device.

FIG. 2(a) illustrates the front face of the electronic device 10. The electronic device 10 is formed with a horizontally long enclosure. The left and right areas thereof held by the user each have an arc-shaped outer frame. A rectangular touch panel 50 is provided on the front face of the electronic device 10. The touch panel 50 includes a display device 20 and a transparent front touch pad 21. The transparent front touch pad 21 covers the front face of the display device 20. The display device 20 is an organic EL (Electro-Liminescence) panel and displays an image. It should be noted that the display device 20 may be other display means such as liquid crystal panel. The front touch pad 21 is a multi-touch pad having a function of detecting a plurality of points touched at the same time. The touch panel 50 is configured as a multi-touch screen.

A triangle button 22a, a circle button 22b, a cross button 22c, and a square button 22d (hereinafter referred to as "controller buttons 22" when referred to collectively) are provided on the right side of the touch panel 50. Each of these buttons is located at one of the vertices of a rhombus. An up key 23a, a left key 23b, a down key 23c, and a right key 23d (hereinafter referred to as "directional keys 23" when referred to collectively) are provided on the left side of the touch panel 50. The user can input eight directions, i.e., up, down, left, right and diagonal directions, by manipulating the directional keys 23. A left stick 24a is provided below the directional keys 23. A right stick 24b is provided below the controller buttons 22. The user tilts the left stick 24a or the right stick 24b (hereinafter referred to as the "analog sticks 24" when referred to collectively) to input the direction and the tilting amount. An L button 26a and an R button 26b are provided on the left and right top portions of the enclosure. The controller buttons 22, the directional keys 23, the analog sticks 24, the L button 26a, and the R button 26b make up manipulation means manipulated by the user.

A front camera 30 is provided near the controller buttons 22. A left speaker 25a and a right speaker 25b (hereinafter referred to as the "speakers 25" when referred to collectively) are provided, respectively, on the left side of the left stick 24a and on the right side of the right stick 24b to output sound. Further, a HOME button 27 is provided below the left stick 24a, and a START button 28 and a SELECT button 29 are provided below the right stick 24b.

[Configuration of the Rear Face]

FIG. 2(b) illustrates the rear face of the electronic device 10. A rear camera 31 and a rear touch pad 32 are provided on the rear face of the electronic device 10. The rear touch pad 32 is configured as a multi-touch pad as is the front touch pad 21. The electronic device 10 is equipped with two cameras and two touch pads, one each on each of the front and rear faces.

[Configuration of the Upper Face]

FIG. 3(a) illustrates the upper face of the electronic device 10. As described earlier, the L button 26a and the R button 26b are provided, respectively, on the left and right edges of the upper face of the electronic device 10. A power button 33 is provided to the right side of the L button 26a. The user turns ON or OFF the power by pressing and holding the power button 33 for a given period of time (e.g., two seconds). It should be noted that the electronic device 10 offers a power control function that puts the electronic device 10 into a suspend state if the manipulation means is not manipulated for a given period of time or more (non-manipulation time). When the electronic device 10 is in the suspend state, the user can bring the electronic device 10 from the suspend state back to an awake state by pressing and holding the power button 33 for a short period of time (e.g., two seconds or less).

Figure 3:
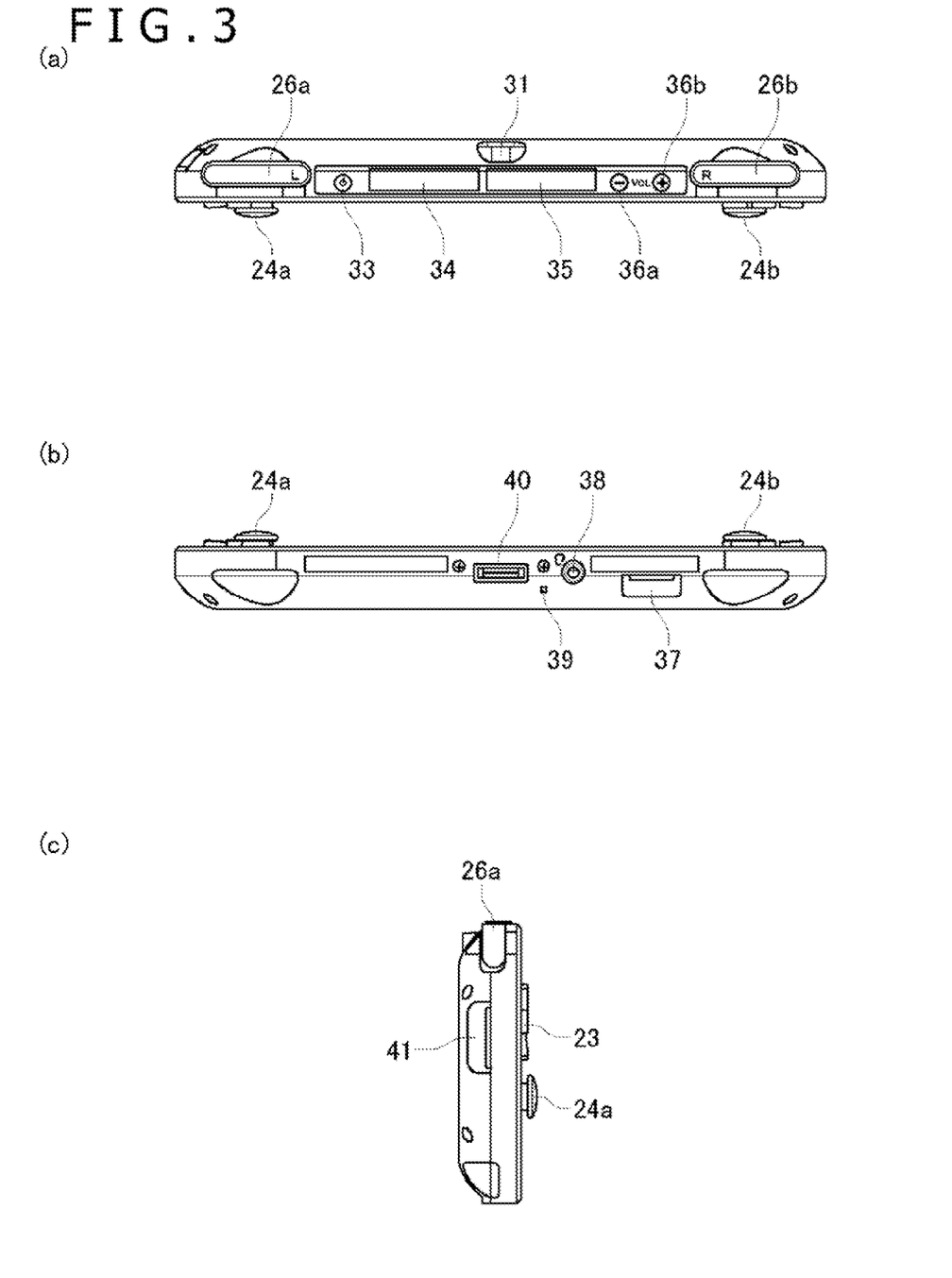
FIG. 3(a) is a diagram illustrating an upper face of the electronic device.
FIG. 3(b) is a diagram illustrating a lower face of the electronic device.
FIG. 3(c) is a diagram illustrating a left side face of the electronic device.

A game card slot 34 is a port into which a game card is inserted. FIG. 3(*a*) shows that the game card slot 34 is covered with a slot cover. It should be noted that an LED lamp may be provided near the game card slot 34 to flash when the game card is accessed. An accessory terminal 35 is designed for connection with a peripheral device (accessory). FIG. 3(*a*) shows that the accessory terminal 35 is covered with a terminal cover. A *minus* button 36*a* and a plus button 36*b* are provided between the accessory terminal 35 and the R button 26*b* to adjust the sound volume.

[Configuration of the Lower Face]

FIG. 3(*b*) illustrates the lower face of the electronic device 10. A memory card slot 37 is a port into which a memory card is inserted. FIG. 3(*b*) shows that the memory card slot 37 is covered with a slot cover. An audio input and output terminal 38, a microphone 39, and a multi-use terminal 40 are provided on the lower face of the electronic device 10. The multi-use terminal 40 supports USB (Universal Serial Bus) and permits connection to other device via a USB cable.

[Configuration of the Left Side Face]

FIG. 3(*c*) illustrates the left side face of the electronic device 10. A SIM card slot 41, a SIM card insertion port, is provided on the left side face of the electronic device 10.

[Circuit Configuration of the Electronic Device]

Figure 4:
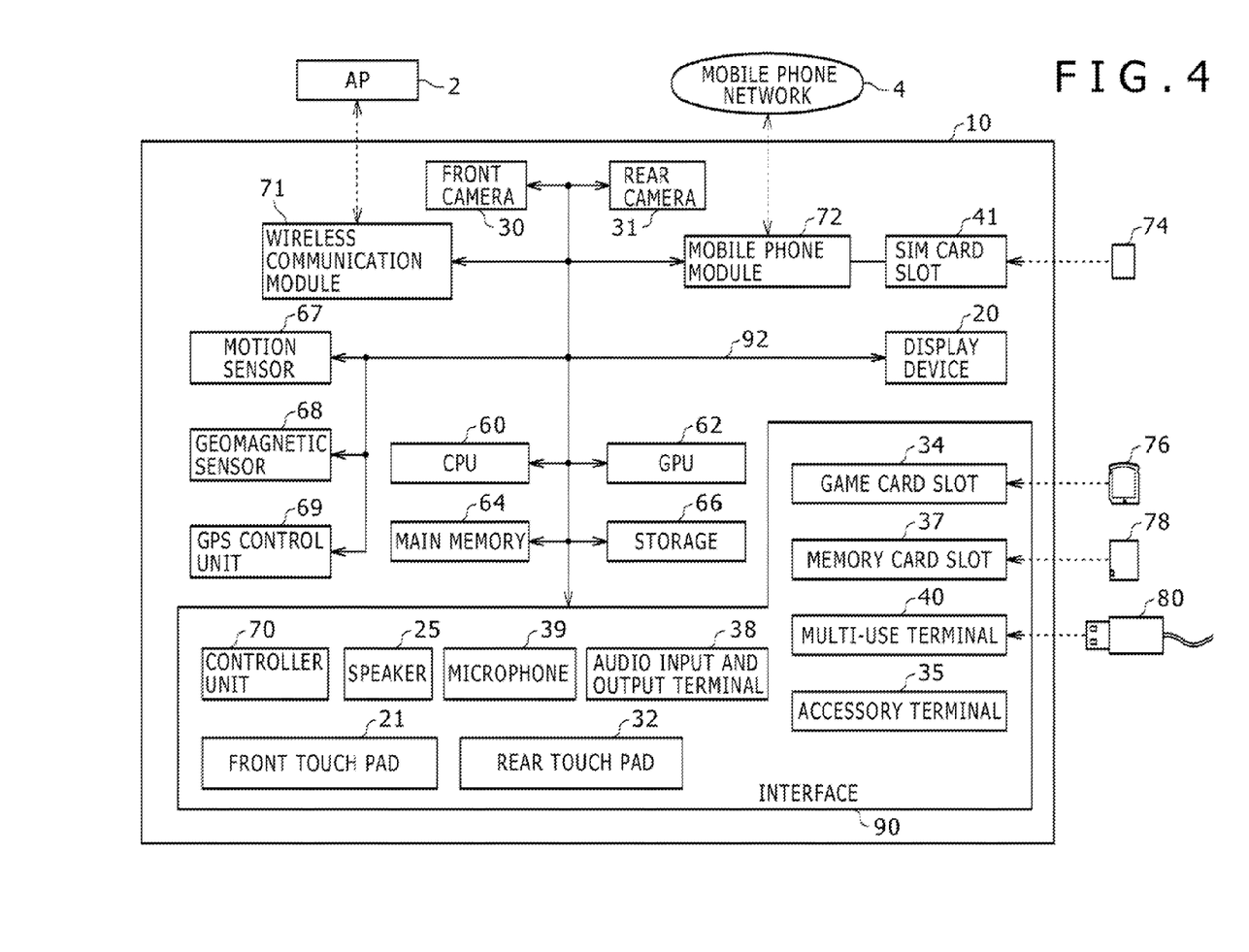
FIG. 4 is a diagram illustrating a circuit configuration of the electronic device.

FIG. 4 illustrates a circuit configuration of the electronic device 10. The elements are connected to each other by a bus 92. A wireless communication module 71 includes a wireless LAN module that is compliant with a communication standard such as IEEE802.11b/g and connects to an external network via the AP 2. It should be noted that the wireless communication module 71 may have a Bluetooth (registered trademark) protocol communication function. A mobile phone module 72 supports the third generation digital mobile phone system compliant with the IMT-2000 (International Mobile Telecommunication 2000) standard defined by the ITU (International Telecommunication Union) and connects to a mobile phone network 4. A SIM card 74 is inserted into the SIM card slot 41. A unique ID number used to identify the telephone number of the mobile phone is stored in the SIM card 74. As the SIM card 74 is inserted into the SIM card slot 41, the mobile phone module 72 can communicate with the mobile phone network 4.

A CPU (Central Processing Unit) 60 executes, for example, a program loaded into a main memory 64. A GPU (Graphics Processing Unit) 62 performs calculations necessary for image processing. The main memory 64 includes, for example, a RAM (Random Access Memory) and stores a program or data used by the CPU 60. A storage 66 includes, for example, a NAND-type flash memory and is used as a built-in auxiliary storage device.

A motion sensor 67 detects the motion of the electronic device 10. A geomagnetic sensor 68 detects triaxial geomagnetism. A GPS control unit 69 receives signals from a GPS satellite and calculates the current position. Each of the front camera 30 and the rear camera 31 captures an image and inputs image data. Each of the front camera 30 and the rear camera 31 includes a CMOS image sensor (Complementary Metal Oxide Semiconductor Image Sensor).

The display device 20 is an organic EL display device and has light-emitting elements each of which emits light when a voltage is applied to its cathode and anode. In power saving mode, a lower-than-normal voltage is applied between the electrodes, thus putting the display device 20 into a dimmed state and minimizing power consumption. It should be noted that the display device 20 may be a liquid crystal display panel having a backlight. In power saving mode, it is possible to put the liquid crystal display panel into a dimmed state and minimize power consumption by reducing the light intensity of the backlight.

In an interface 90, a controller unit 70 includes a variety of manipulation means of the electronic device 10, namely, the controller buttons 22, the directional keys 23, the analog sticks 24, the L and R buttons 26*a* and 26*b*, the HOME button 27, the START button 28, the SELECT button 29, the power button 33, and the minus and plus buttons 36*a* and 36*b*. Each of the front touch pad 21 and the rear touch pad 32 is a multi-touch pad. The front touch pad 21 is overlaid on the surface of the display device 20. The speakers 25 output sound generated by various functions of the electronic device 10. The microphone 39 inputs sound surrounding the electronic device 10. The audio input and output terminal 38 inputs stereo sound from an external microphone and outputs stereo sound to an external headphone or other device.

A game card 76 storing a game file is inserted into the game card slot 34. The game card 76 has a writable storage area. When the game card 76 is placed in the game card slot 34, data is written or read by a media drive. A memory card 78 is inserted into the memory card slot 37. When placed in the memory card slot 37, the memory card 78 is used as an external auxiliary storage device. The multi-use terminal 40 can be used as a USB terminal. A USB cable 80 is connected to the multi-use terminal 40 for exchange of data with other USB device. A peripheral device is connected to the accessory terminal 35.

The electronic device 10 according to the present working example has a function to capture a screenshot and generate an image file during execution of content and also has a function to play a screenshot image file. A description will be given below of these functions.

Figure 5:
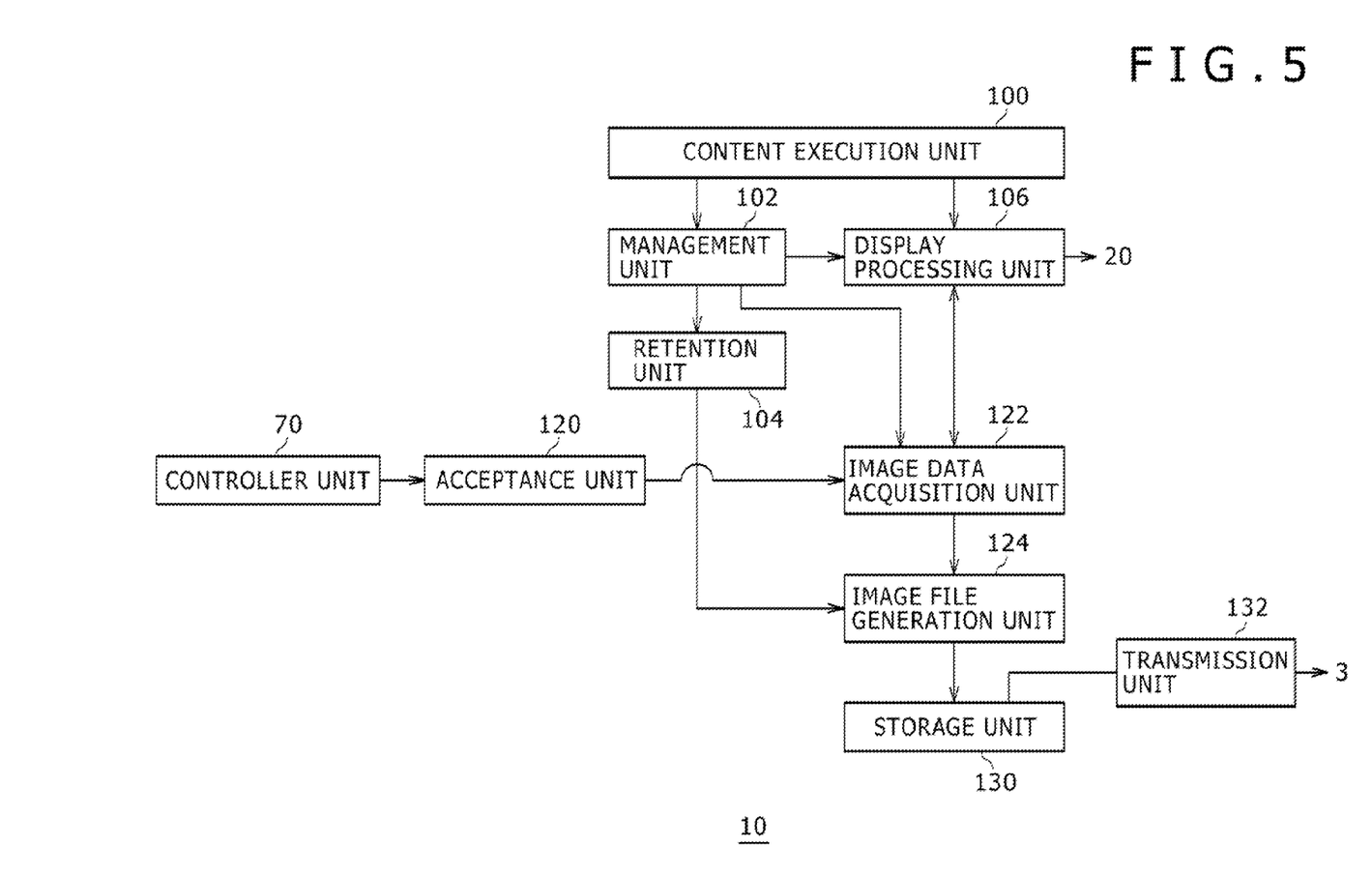
FIG. 5 is a diagram illustrating functional blocks for implementing an image file generation function.

FIG. 5 illustrates functional blocks for implementing the image file generation function of the electronic device 10. The configuration illustrated in FIG. 5 is implemented, in terms of hardware components, by an arbitrary CPU, a memory, a program loaded into the memory of computer and so on. Here, the functional blocks implemented as a result of coordinated operation of these components are shown. Therefore, it is to be understood by those skilled in the art that these functional blocks can be implemented in a variety of ways including hardware alone, software alone, and a combination thereof.

In the electronic device 10, a content execution unit 100 executes content, and a display processing unit 106 displays a content image on the display device 20. The content execution unit 100 executes a game program in response to user manipulation input and generates game image data. More specifically, the content execution unit 100 installs a virtual camera in a three-dimensional game space and moves the virtual camera in response to user manipulation input, thus generating game image data projected from the virtual camera onto a virtual screen. The generated game image data is supplied to a frame buffer of the display processing unit 106. The display processing unit 106 displays the game image on the display device 20.

As described earlier, the content execution unit 100 may execute content such as movie data. In this case, the execution of content means the decoding and playing of the content. The display processing unit 106 displays decoded image data on the display device 20.

When the content execution unit 100 begins to execute content in response to user instruction, a management unit 102 acquires the content ID from the content and causes a retention unit 104 to retain the content ID. The management unit 102 causes the retention unit 104 to retain the ID of content executed in the foreground of the electronic device 10, i.e., content displayed on the display device 20. At this time, the management unit 102 acquires attribute information such as content name from the content and causes the retention unit 104 to retain this information.

Content being executed may supply various pieces of information to the management unit 102. If content being executed is a game program, the game program supplies the progress status to the management unit 102. If the game includes a plurality of stages, the game program supplies the stage number on which the user is playing to the management unit 102. If the stage number changes, the game program notifies the stage number after the change to the management unit 102. The management unit 102 causes the retention unit 104 to retain the notified stage number. As a result, the retention unit 104 retains the content ID, content attribute information, and the progress status of the content.

Further, content being executed supplies, to the management unit 102, an instruction indicating whether or not to prohibit the electronic device 10 from acquiring display image data. The acquisition of display image data corresponds to capturing a so-called screenshot. That is, content notifies the electronic device 10 of the instruction as to whether or not to prohibit screenshot capture. This instruction is set in advance in the content by the content creator. For example, an instruction to prohibit acquisition of display image data is set in game scenes that are desirably disclosed only to players. An instruction to permit acquisition of display image data is set in game scenes that may be disclosed to other parties. Then, the game program notifies the instruction to the management unit 102 when a game scene with an instruction set therein is displayed. In addition, if content is a movie, it is basically likely that an instruction to prohibit acquisition of display image data is often set in all the scenes. However, it is likely that an instruction to permit acquisition of display image data is often set at least in scenes from trailer videos displayed as publicity. In any case, the instruction as to whether or not to prohibit screenshot capture is determined by the content creator.

Each time an instruction is switched from prohibition to permission or vice versa, content notifies the instruction to the management unit 102. This instruction may be represented as a flag value. For example, a flag value of "0" may be an instruction to prohibit acquisition of image data, and a flag value of "1" may be an instruction to permit acquisition of image data. The management unit 102 may cause the retention unit 104 to retain this instruction. Alternatively, the management unit 102 may notify this instruction to an image data acquisition unit 122 adapted to capture a screenshot.

Figure 6:
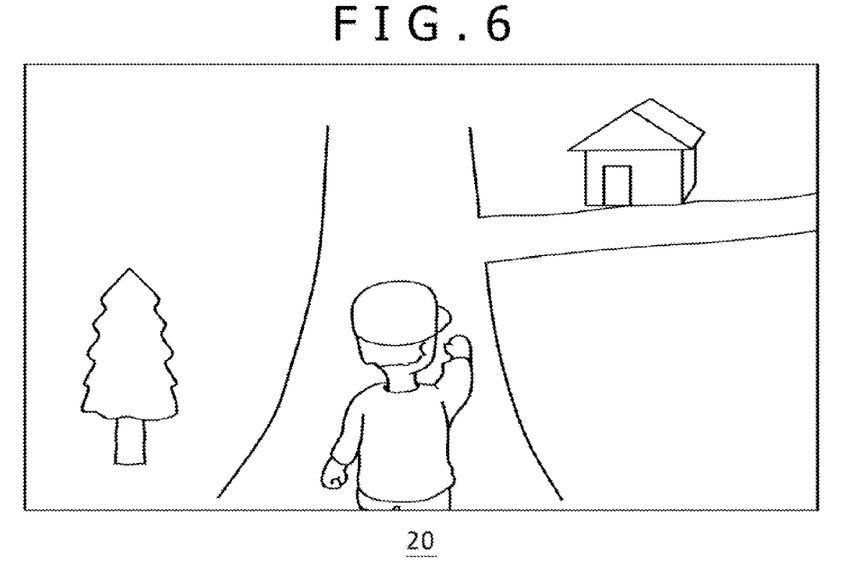
FIG. 6 is a diagram illustrating a content image displayed on a display device by a display processing unit.

FIG. 6 illustrates a content image displayed on the display device 20 by the display processing unit 106. FIG. 6 illustrates a game screen. The user moves a character in the game space by manipulating an input unit such as the controller unit 70 or the front touch pad 21.

In the electronic device 10, the image data acquisition unit 122 and an image file generation unit 124 generate a screenshot image file. When the user makes a given input to the controller unit 70 with a content image appearing on the display device 20, an acceptance unit 120 accepts an instruction to acquire image data. This instruction to acquire image data is an instruction to capture a so-called screenshot. For example, if the HOME button 27 and the START button 28 are pressed and held simultaneously for a given period of time (e.g., 0.5 seconds) or more, the acceptance unit 120 accepts an instruction to capture a screenshot.

Upon acceptance of an instruction to acquire image data, the acceptance unit 120 issues a capture instruction to the image data acquisition unit 122. At this time, the content execution unit 100 suspends the execution of the content. Upon receipt of the capture instruction, the image data acquisition unit 122 acquires the image data of the display image available in the frame buffer of the display processing unit 106, compressing the data in a given format such as JPEG.

The image file generation unit 124 acquires the content ID, content attribute information, and the progress status of the content retained by the retention unit 104 and generates an image file that associates the above pieces of information with the image data compressed by the image data acquisition unit 122. The image file generation unit 124 may generate a single image file by embedding the content ID retained by the retention unit 104 and other information in an Exif (Exchangeable Image File Format) file and combining the Exif file and the image data. The image file generation unit 124 stores the generated image file in a storage unit 130. The storage unit 130 may be any one of the memory card 78, the storage 66, and the main memory 64. At this time, the image file generation unit 124 automatically determines a filename using the content title and stores the file in a screenshot folder in the storage unit 130. When the image file is stored in the storage unit 130, the content execution unit 100 resumes the execution of the content.

The above image data acquisition process is performed on the assumption that screenshot capture is permitted by the content. As described above, the content may notify an instruction to permit acquisition of image data to the management unit 120. Alternatively, unless notified of an instruction to prohibit acquisition of image data by the content, the electronic device 10 may determine that screenshot capture is permitted. That is, screenshot capture may be not prohibited when the image data acquisition process is initially set up, and acquisition of image data may be prohibited only when the content notifies an instruction to prohibit acquisition of image data.

When the management unit 102 accepts an instruction to prohibit acquisition of image data from the content, the image data acquisition unit 122 is prohibited from acquiring image data. Upon receipt of an instruction to prohibit acquisition of image data from the management unit 102, the image data acquisition unit 122 does not respond to an instruction to acquire image data from the acceptance unit 120 until the prohibition is cancelled. When the management unit 102 accepts an instruction to permit acquisition of image data from the content and notifies the image data acquisition unit 122, the prohibition of acquisition of image data is cancelled. This allows the image data acquisition unit 122 to capture a screenshot. It should be noted that if the management unit 102 causes the retention unit 104 to retain an instruction to prohibit acquisition of image data as described above, the image data acquisition unit 122 decides, upon receipt of an acquisition instruction from the acceptance unit 120, not to respond to the acquisition instruction after verifying that the instruction to prohibit acquisition of image data is included in the retention unit 104.

Figure 7:
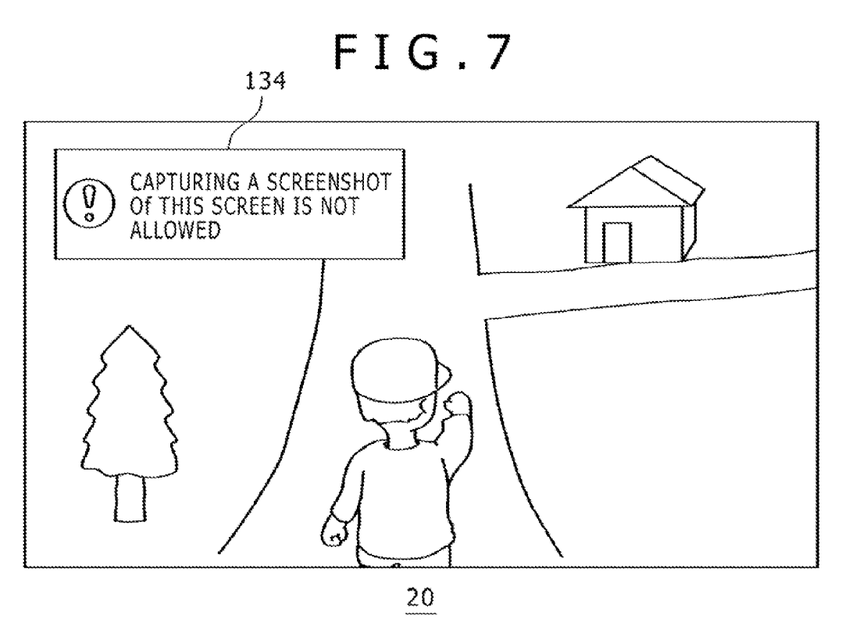
FIG. 7 is a diagram illustrating a message to the effect that screenshot capture is not allowed.

FIG. 7 illustrates a message to the effect that screenshot capture is not allowed. If the acceptance unit 120 accepts an instruction to acquire image data when the content issues an instruction to prohibit acquisition of image data, the image data acquisition unit 122 notifies the display processing unit 106 that screenshot capture is not allowed. In response to this notice, the display processing unit 106 displays a notification image 134 on the display device 20. The notification image 134 indicates that the acquisition of image data is not allowed. This makes the user aware that screenshot capture is prohibited. It should be noted that if the management unit 102 is notified of an instruction to permit acquisition of image data by the content after the display processing unit 106 displays the notification image 134 once, the display processing unit 106 may display, on the display device 20, a notification image indicating that screenshot capture is now allowed. It should be noted that if the notification image 134 indicating that screenshot capture is prohibited has not been displayed even once, the user is not aware that screenshot capture is prohibited. Therefore, the display processing unit 106 may not display, on the display device 20, a notification image indicating that screenshot capture is now allowed.

A case has been shown above in which only one piece of content is executed in the foreground. However, there are cases in which a plurality of pieces of content are executed in the foreground. For example, one of such cases is that the screen of the display device 20 is divided into two parts, and a piece of content is executed in each of the divided screens. The management unit 102 manages the content ID, content attribute information, and the progress status of the content for each of a plurality of pieces of content and causes the retention unit 104 to retain these pieces of information. If an instruction to capture a screenshot is input from the user at this time, the image file generation unit 124 includes information on the plurality of pieces of content in an Exif file and combines the Exif file and the image data acquired by the image data acquisition unit 122, thus generating a single image file.

It should be noted that while two pieces of content are executed at the same time, it may be clear that one of the two pieces of content is main content, and that the other pieces of content is subordinate content. For example, if one chats with his or her friend while a game is executed, the game program is main content, and the chat application is subordinate content. If there is a main-subordinate relationship between a plurality of pieces of content installed in the electronic device 10, the management unit 102 may maintain a main-subordinate relationship. If the main content and the subordinate content are executed at the same time, the management unit 102 may notify the image file generation unit 124 of this relationship. As a result, the image file generation unit 124 may not include information on the subordinate content and include only information on the main content in an Exif file when generating the Exif file.

A screenshot image file is generated and stored in the storage unit 130 as described above. The user can transmit the image file to the electronic device 10 of his or her friend by attaching the image file, for example, to an e-mail. A transmission unit 132 transmits the image file to the other electronic device 10.

Figure 8:
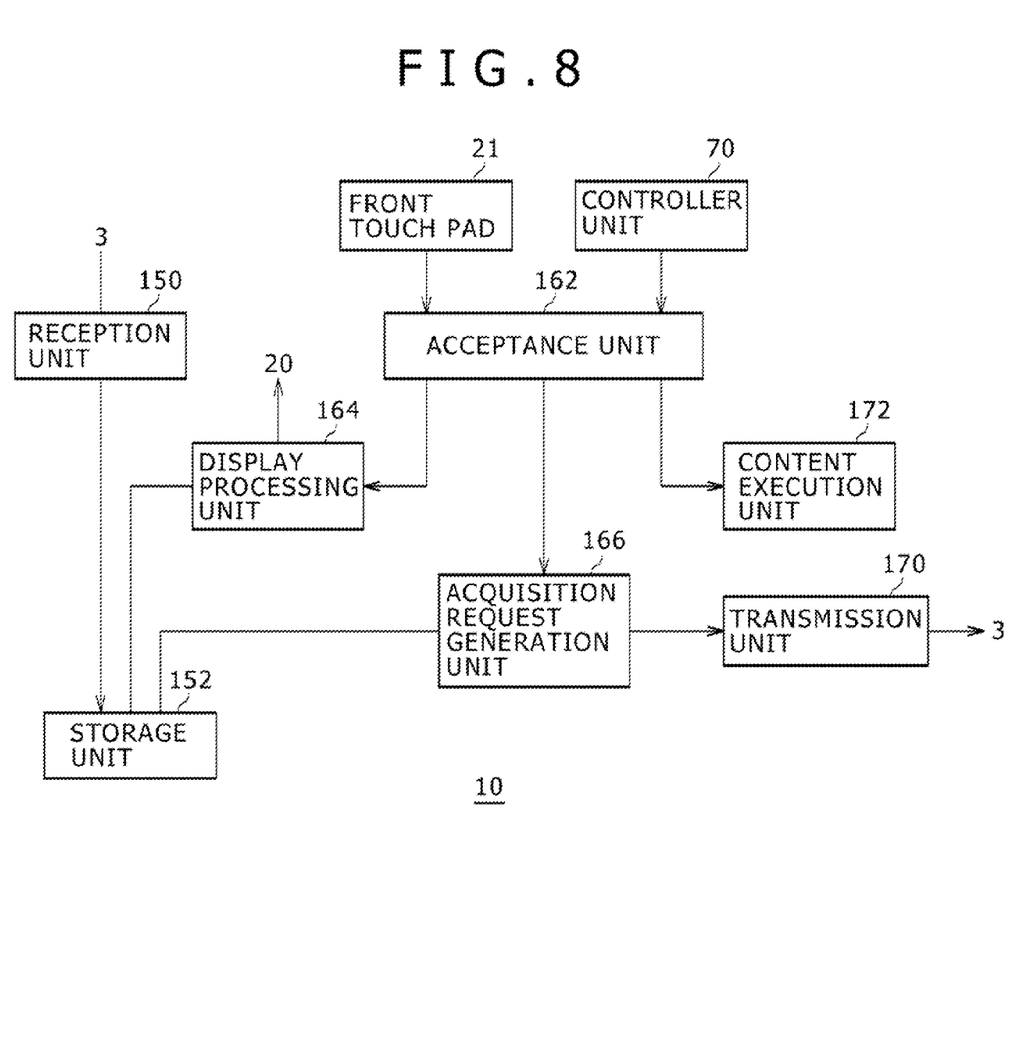
FIG. 8 is a diagram illustrating functional blocks for implementing a function to play a screenshot image file.

FIG. 8 illustrates functional blocks for implementing a function to play a screenshot image file in the electronic device 10. The configuration illustrated in FIG. 8 implements a function to receive and play a screenshot image file. The configuration illustrated in FIG. 8 is implemented, in terms of hardware components, by an arbitrary CPU, a memory, a program loaded into the memory of the computer and so on. Here, the functional blocks implemented as a result of coordinated operation of these components are shown. Therefore, it is to be understood by those skilled in the art that these functional blocks can be implemented in a variety of ways including hardware alone, software alone, and a combination thereof. It should be noted that both of the configurations illustrated in FIGS. 5 and 8 are included in the single electronic device 10.

A reception unit 150 receives a screenshot image file from the other electronic device 10. The received image file is stored in a storage unit 152. The storage unit 152 may be any one of the memory card 78, the storage 66, and the main memory 64.

The user selects an image file from an input unit such as the front touch pad 21 or the controller unit 70. When an acceptance unit 162 accepts the image file selection operation, a display processing unit 164 reads the specified image file from the storage unit 152 and displays a content image. At this time, the display processing unit 164 serves as a so-called viewer.

Figure 9:
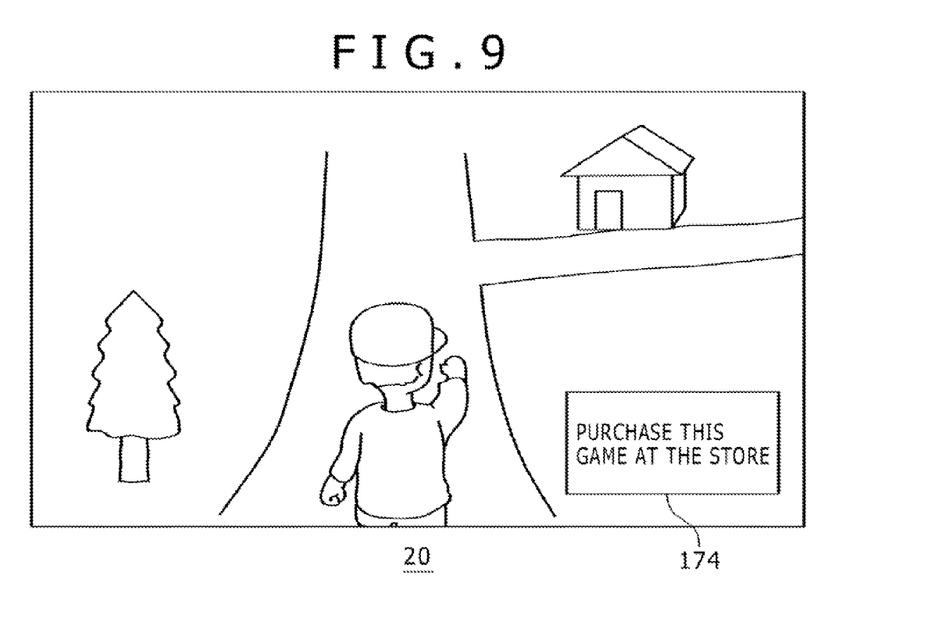
FIG. 9 is a diagram illustrating a content image displayed using an image file.

FIG. 9 illustrates a content image displayed using an image file. The display processing unit 164 displays an image related to acquisition of content if a content ID is included in the image file. In the present working example, an image relating to acquisition of content is a link button 174 that permits access to the server 5. When the user taps the link button 174, the acceptance unit 162 recognizes that the link button 174 has been selected. An acquisition request generation unit 166 generates a request to acquire content. This acquisition request includes a content ID. The acquisition request generation unit 166 retains address information of the server 5 in the network 3 and generates a packet including this address information and acquisition request. This packet is transmitted from a transmission unit 170 to the server 5.

It should be noted that a case is shown in FIG. 9 in which the link button 174 is overlaid on a content image. However, the link button 174 may be displayed as one of the items included in an option menu. For example, copying and deletion of the content image may be included as other items in the option menu. Further, the option menu may be overlaid on the content image by tapping a given button (not shown) on the screen.

Figure 10:
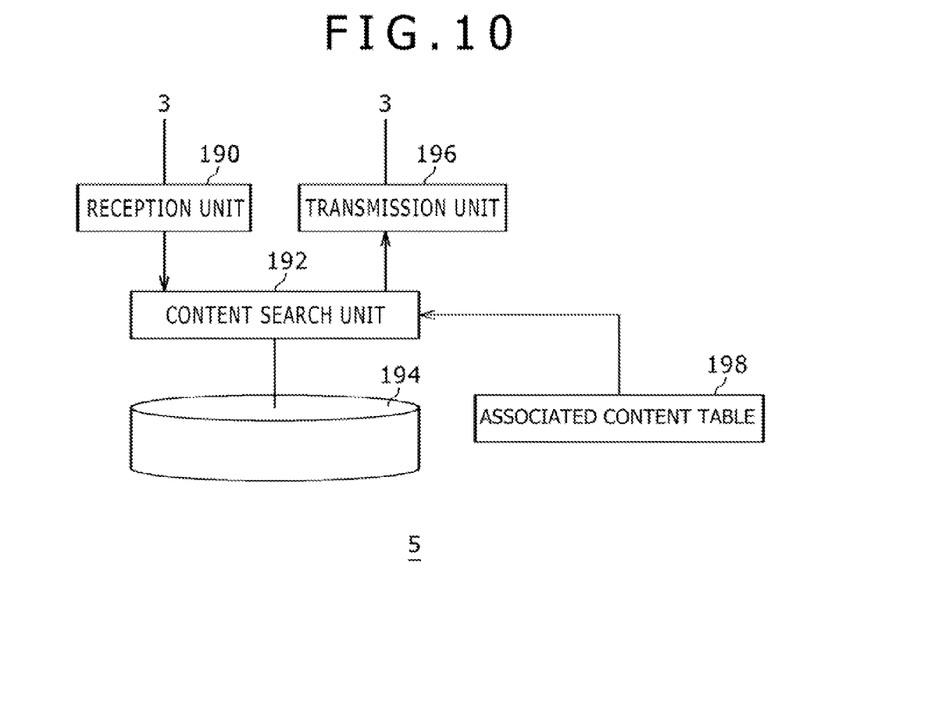
FIG. 10 is a diagram illustrating functional blocks of a server.

FIG. 10 illustrates functional blocks of the server 5. The server 5 includes a reception unit 190, a content search unit 192, a content DB 194, a transmission unit 196, and an associated content table 198. The content DB 194 stores a plurality of pieces of content.

When the reception unit 190 receives a packet including a content ID from the electronic device 10, the content search unit 192 verifies whether or not the piece of content identified by the content ID included in the packet exists in the content DB 194. Upon verification that the piece of content exists in the content DB 194, the content search unit 192 generates data for generating a page for acquiring the piece of content (acquisition page configuration data). The transmission unit 196 transmits this data to the electronic device 10. In the electronic device 10, the display processing unit 164 displays the acquisition page on the display device 20. A purchase button used to purchase content is available on the acquisition page. When the user selects the purchase button, the transmission unit 170 transmits a purchase request to the server 5, and the server 5 transmits the piece of content to the electronic device 10. This allows the user to readily download the piece of content played by other user by using a screenshot captured by the other user.

In the information processing system 1, on the other hand, the server 5 is available for each region. The whole world is divided into several regions according, for example, to language. Therefore, even when the title is the same, the content IDs are different if the regions are different. The associated content table 198 manages IDs of pieces of content having the same title on a region-by-region basis. For example, the associated content table 198 retains, in a table form, the fact that a piece of content having content ID "AAAA" in region "X" is the same as a piece of content having content ID "BBBB" in region "Y."

If region "Y" exists in the server 5, and when the reception unit 190 receives, from the electronic device 10, a request to acquire a piece of content whose content ID is "AAAA," the content search unit 192 recognizes from the associated content table 198 that the same title sold in region "Y" has content ID "BBBB." Therefore, the content search unit 192 generates acquisition page configuration data for the piece of content which is different from content ID included in acquisition request but identified by the associated content ID. Then, the transmission unit 196 transmits this data to the electronic device 10. This makes it possible to notify to the user of the electronic device 10 that the piece of content identified by the content ID associated with the content ID of the image file exists. It should be noted that the associated content table 198 may retain content IDs associated with the titles which are closely resembling rather than identical.

The present invention has been described based on an embodiment. It is to be understood by those skilled in the art that this embodiment is illustrative, that the combination of the elements and the processes can be modified in various ways, and that such modification examples also fall within the scope of the present invention.

In the working example, the management unit 102 causes the retention unit 104 to retain information such as content ID of content running in the foreground. For example, however, if additional content such as DLC (Download Content) is also used, the retention unit 104 may also retain information such as content ID of DLC. When a screenshot is captured, the image file generation unit 124 may generate an image file by also including DLC information in an Exif file.

If a plurality of content IDs are included in an image file, the display processing unit 164 displays the plurality of link buttons 174 on the display device 20. At this time, the user can readily select the link button 174 if a target content title appears on each of the link buttons 174.

It should be noted that an example has been described with reference to FIG. 9 in which the link button 174 is overlaid on a content image when an image file is played. However, if the electronic device 10 already has the piece of content of the display image, it is not necessary to display the link button 174. For example, if the electronic device 10 which has captured a screenshot plays the image data of that screenshot, the electronic device 10 normally has the piece of content in question. Therefore, it is not necessary to display the link button 174. After the screenshot is played, a content execution unit 172 may automatically start and execute that piece of content. At this time, the content execution unit 172 may refer to the progress status of the game included in the screenshot image file and execute the piece of content from the stage number identified by the progress status.

In the above case, a content start button may be overlaid on the content image rather than the link button 174. When the user taps the content start button, the acceptance unit 162 recognizes that the content start button has been selected, and the content execution unit 172 starts that piece of content. It should be noted that the content start button may be displayed as one of the items in an option menu. For example, copying and deletion of the content image may be included as other items in the option menu. Further, the option menu may be overlaid on the content image by tapping a given button (not shown) on the screen.

Still further, if a plurality of content IDs are included in an image file, items appropriate to each content ID may be included in the option menu. For example, if a screenshot is captured while a grand slam tournament, installed as an additional piece of content, is played in a tennis game, the image file generation unit 124 generates an image file that includes the tennis game content ID and the additional content ID. In the other electronic device 10, the reception unit 150 receives this image file, and the display processing unit 164 displays the content image.

At this time, if the other electronic device 10 has the tennis game and the additional piece of content, the tennis game start button is displayed as an item in the option menu. If the user starts the tennis game here, the tennis game may acquire the content ID of the additional piece of content so that the user can play the grand slam tournament. It should be noted that the additional content start button may also be displayed so that when this item is tapped, the tennis game acquires the content ID of the additional piece of content so that the user can play the grand slam tournament. It should be noted that if the other electronic device 10 has the tennis game, but not the additional piece of content, the link button 174 of the additional piece of content may be displayed as a menu item. If the other electronic device 10 has neither the tennis game nor the additional content, the link button 174 of the tennis game may be displayed as a menu item. It should be noted that if the other electronic device 10 has the tennis game, but not the additional content, the tennis game start button may be displayed together with the link button 174 of the additional piece of content as menu items.

It should be noted that if a screenshot is captured within a given period of time, the image file generation unit 124 may include, for a limited time only, a special content ID associated with content in an image file. This content ID is received from the server 5 in advance. It should be noted that a special URL may be received from the server 5 rather than a special content ID. If the content image is displayed using this image file, the server 5 may supply a page that gives the user a benefit when the user taps the link button 174. It should be noted that the image file generation unit 124 includes a content ID in an image file as usual if a screenshot is captured outside a given period of time.

REFERENCE SIGNS LIST

1 . . . Information processing system, 10 . . . Electronic device, 20 . . . Display device, 100 . . . Content execution unit, 102 . . . Management unit, 104 . . . Retention unit, 106 . . . Display processing unit, 120 . . . Acceptance unit, 122 . . . Image data acquisition unit, 124 . . . Image file generation unit, 130 . . . Storage unit, 132 . . . Transmission unit, 134 . . . Notification image, 150 . . . Reception unit, 152 . . . Storage unit, 162 . . . Acceptance unit, 164 . . . Display processing unit, 166 . . . Acquisition request generation unit, 170 . . . Transmission unit, 172 . . . Content execution unit, 174 . . . Link button, 190 . . . Reception unit, 192 . . . Content search unit, 194 . . . Content DB, 196 . . . Transmission unit, 198 . . . Associated content table

INDUSTRIAL APPLICABILITY

The present invention is applicable to the field of image processing.

The invention claimed is:

1. An information processing system comprising:
first and second electronic devices, wherein
the first electronic device includes
a retention unit adapted to retain content identification information,
a first display processing unit adapted to display a content image,
an acceptance unit adapted to accept an instruction to acquire image data, an acquisition unit adapted to acquire display image data when the acceptance unit accepts an acquisition instruction, a file generation unit adapted to generate an image file that associates the content identification information retained by the retention unit with the acquired image data, and a first transmission unit adapted to transmit the image file to the second electronic device; and the second electronic device includes a reception unit adapted to receive an image file from the first electronic device, a second display processing unit adapted to display a content image using the acquired image file, the second display processing unit displaying an image relating to acquisition of content together with a content image, and a second transmission unit adapted to transmit content identification information to a content server when an image relating to acquisition of content is selected, wherein upon receipt of content identification information from the second electronic device, the content server verifies whether or not a piece of content identified by the content identification information exists and, if so, notifies the second electronic device that the piece of content exists.

2. The information processing system of claim 1, wherein the second display processing unit displays an image relating to acquisition of content if an image file includes content identification information.

3. The information processing system of claim 1, wherein the second display processing unit displays a link button that permits access to the content server as an image relating to acquisition of content.

4. The information processing system of claim 1, wherein the first electronic device further includes:

an execution unit adapted to execute content; and a management unit adapted to cause the retention unit to retain identification information of content executed by the execution unit.

5. The information processing system of claim 4, wherein when the management unit accepts an instruction to prohibit acquisition of image data from content executed by the execution unit, the acquisition unit is prohibited from acquiring image data.

6. The information processing system of claim 5, wherein if the acceptance unit accepts the instruction to prohibit acquisition of image data, the first display processing unit displays a notification image indicating that acquisition of image data is not allowed.

7. An electronic device comprising:

a storage unit adapted to store content identification information and a content image file;

a first display processing unit adapted to display a content image using the stored image file, wherein the display processing unit displays a content image and also displays an image relating to acquisition of content if the content image file includes the content identification information, an acceptance unit adapted to accept an instruction to acquire image data, an acquisition unit adapted to acquire display image data when the acceptance unit accepts an acquisition instruction, a file generation unit adapted to generate an image file that associates the content identification information retained by the retention unit with the acquired image data, and a first transmission unit adapted to transmit the image file to a second electronic device, wherein the second electronic device includes: (i) a reception unit adapted to receive an image file from the first electronic device, (ii) a second display processing unit adapted to display a content image using the acquired image file, the second display processing unit displaying an image relating to acquisition of content together with a content image, and (iii) a second transmission unit adapted to transmit content identification information to a content server when an image relating to acquisition of content is selected, and wherein upon receipt of content identification information from the second electronic device, the content server verifies whether or not a piece of content identified by the content identification information exists and, if so, notifies the second electronic device that the piece of content exists.

8. An image file playing method comprising:

storing a content image file in a first electronic device;

retaining content identification information in the first electronic device;

displaying a content image, accepting an instruction to acquire image data in the first electronic device;

acquiring display image data in the first electronic device when instruction to acquire is accepted;

generating an image file in the first electronic device that associates the retained content identification information with the acquired image data;

transmitting the image file from the first electronic device to a second electronic device;

wherein the second electronic device includes (i) a reception unit adapted to receive an image file from the first electronic device, (ii) a second display processing unit adapted to display a content image using the acquired image file, the second display processing unit displaying an image relating to acquisition of content together with a content image, and (iii) a second transmission unit adapted to transmit content identification information to a content server when an image relating to acquisition of content is selected, wherein upon receipt of content identification information from the second electronic device, the content server verifies whether or not a piece of content identified by the content identification information exists and, if so, notifies the second electronic device that the piece of content exists.

9. An image file generating method comprising:

receiving content identification information at a server from a second electronic device, wherein the second electronic device includes (i) a reception unit adapted to receive an image file from a first electronic device, (ii) a second display processing unit adapted to display a content image using the acquired image file, the second display processing unit displaying an image relating to acquisition of content together with a content image, and (iii) a second transmission unit adapted to transmit content identification information to the content server when an image relating to acquisition of content is selected; and verifying whether or not a piece of content identified by the content identification information exists and, if so, notifying the second electronic device that the piece of content exists, wherein the first electronic device includes: (i) a retention unit adapted to retain content identification information, (ii) a first display processing unit adapted to display a content image, (iii) an acceptance unit adapted to accept an instruction to acquire image data, (iv) an acquisition unit adapted to acquire display image data when the acceptance unit accepts an acquisition instruction, (v) a file generation unit adapted to generate an image file that associates the content identification information retained by the retention unit with the acquired image data, and (vi) a first transmission unit adapted to transmit the image file to the second electronic device.

10. A non-transitory, computer readable storage medium containing a computer program for causing a computer to carry out actions, comprising:

storing a content image file in a first electronic device;
retaining content identification information in the first electronic device;
displaying a content image,
accepting an instruction to acquire image data in the first electronic device;
acquiring display image data in the first electronic device when instruction to acquire is accepted;
generating an image file in the first electronic device that associates the retained content identification information with the acquired image data;
transmitting the image file from the first electronic device to a second electronic device;
wherein the second electronic device includes (i) a reception unit adapted to receive an image file from the first electronic device, (ii) a second display processing unit adapted to display a content image using the acquired image file, the second display processing unit displaying an image relating to acquisition of content together with a content image, and (iii) a second transmission unit adapted to transmit content identification information to a content server when an image relating to acquisition of content is selected,
wherein upon receipt of content identification information from the second electronic device, the content server verifies whether or not a piece of content identified by the content identification information exists and, if so, notifies the second electronic device that the piece of content exists.

11. A non-transitory, computer readable storage medium containing a computer program for causing a computer to carry out actions, comprising:

receiving content identification information at a server from a second electronic device, wherein the second electronic device includes (i) a reception unit adapted to receive an image file from a first electronic device, (ii) a second display processing unit adapted to display a content image using the acquired image file, the second display processing unit displaying an image relating to acquisition of content together with a content image, and (iii) a second transmission unit adapted to transmit content identification information to the content server when an image relating to acquisition of content is selected; and
verifying whether or not a piece of content identified by the content identification information exists and, if so, notifying the second electronic device that the piece of content exists,
wherein the first electronic device includes: (i) a retention unit adapted to retain content identification information, (ii) a first display processing unit adapted to display a content image, (iii) an acceptance unit adapted to accept an instruction to acquire image data, (iv) an acquisition unit adapted to acquire display image data when the acceptance unit accepts an acquisition instruction, (v) a file generation unit adapted to generate an image file that associates the content identification information retained by the retention unit with the acquired image data, and (vi) a first transmission unit adapted to transmit the image file to the second electronic device.

* * * * *